UNITED STATES PATENT OFFICE.

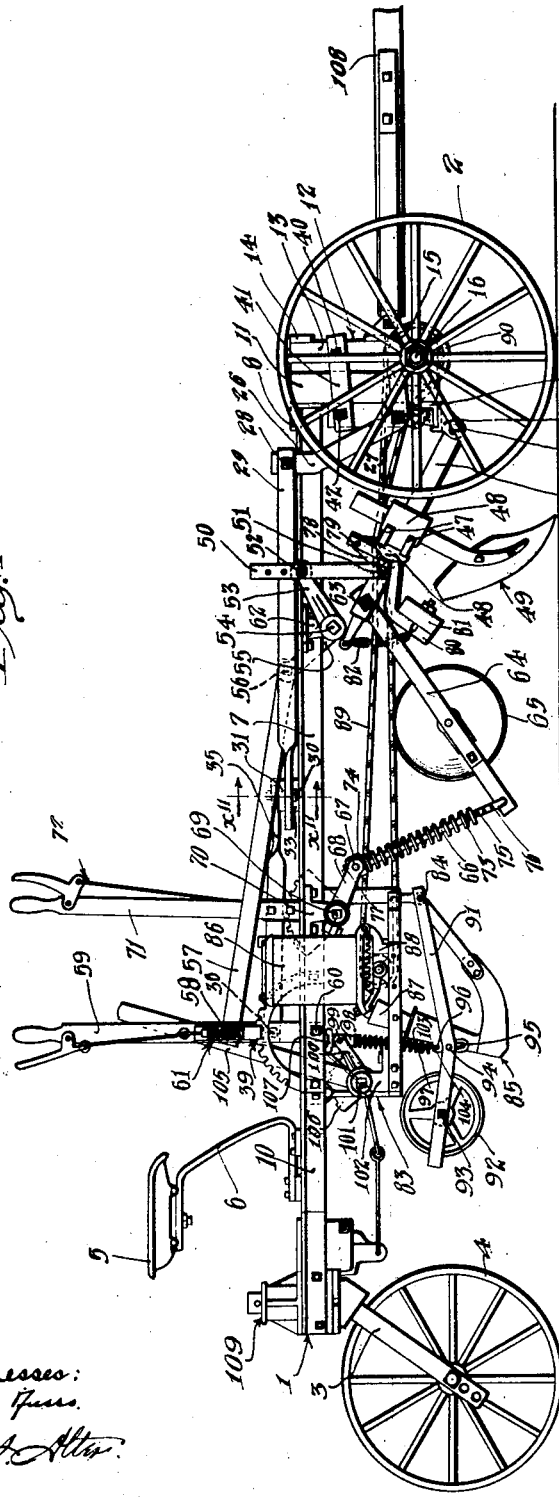

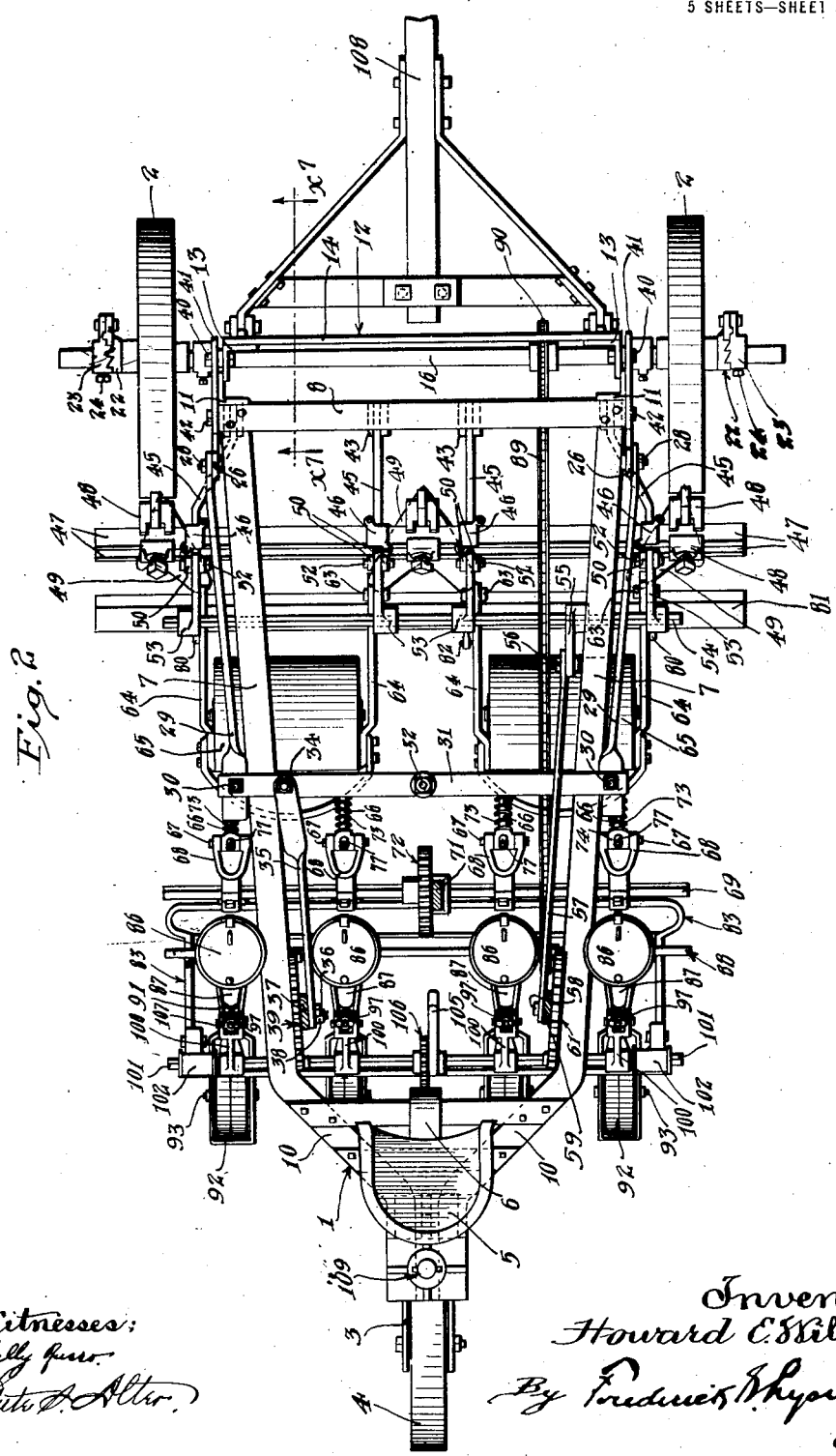

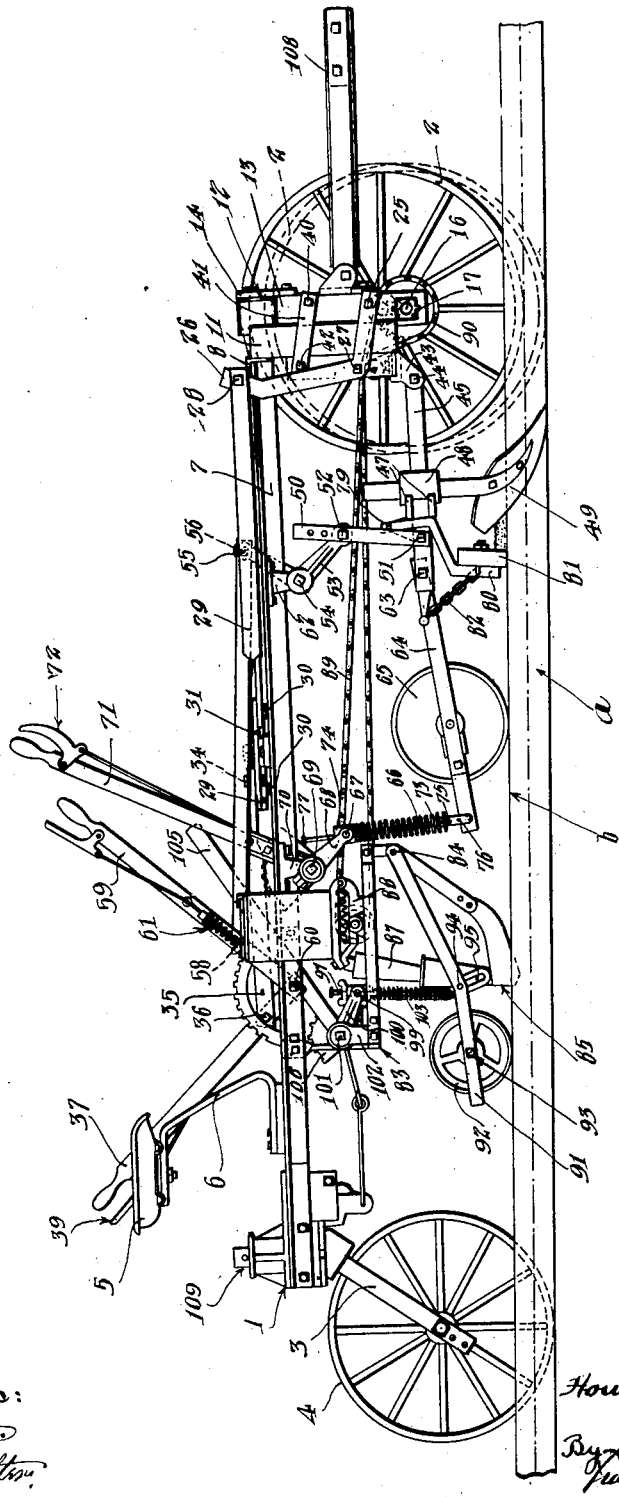

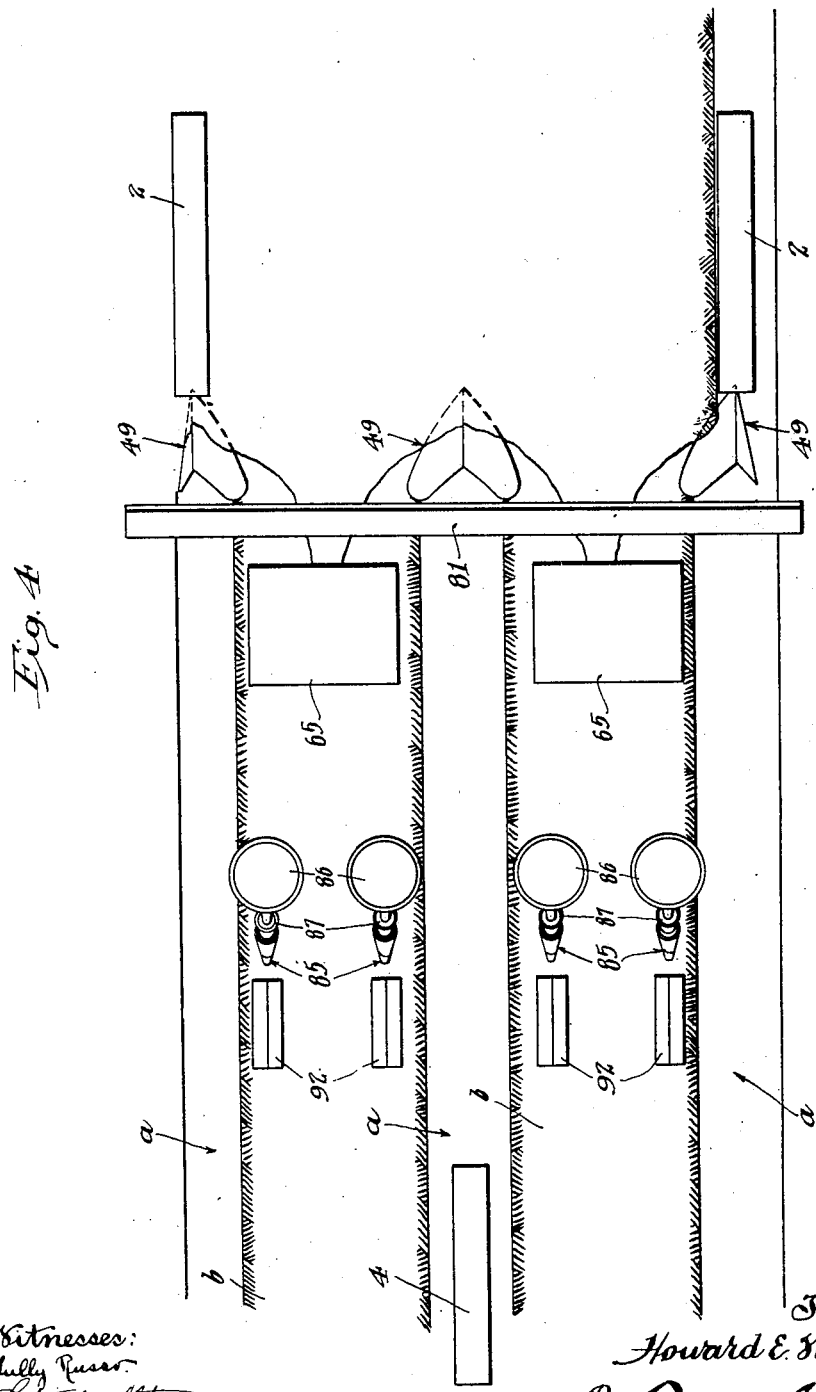

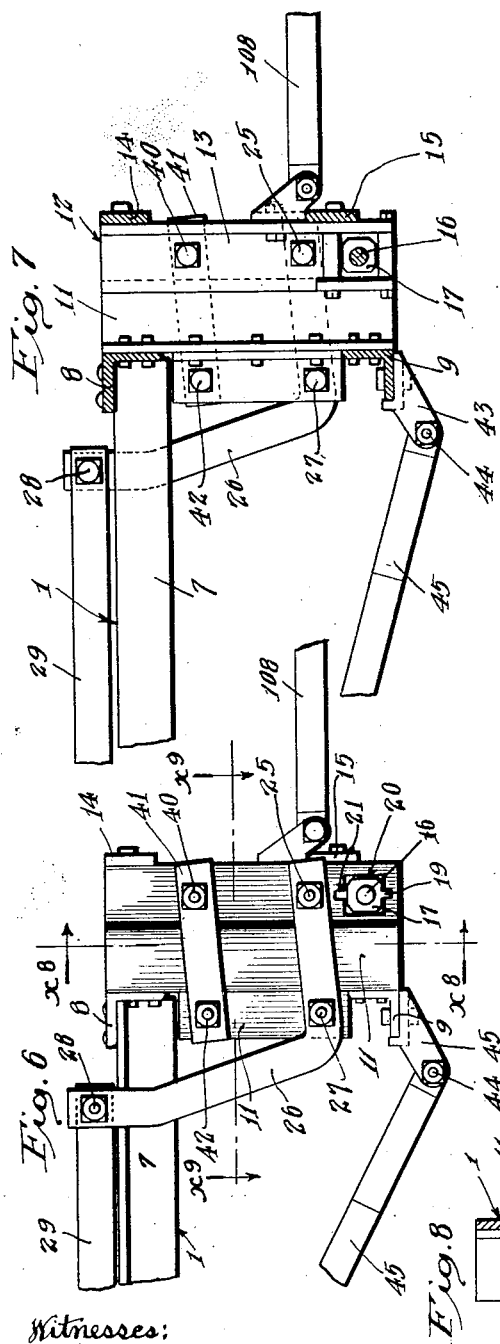

HOWARD E. WILLIAMS, OF LOS ANGELES, CALIFORNIA.

METHOD OF PLANTING SEED AND AN AGRICULTURAL IMPLEMENT FOR PERFORMING THE SAME.

1,371,012.     Specification of Letters Patent.     Patented Mar. 8, 1921.

Application filed October 13, 1919. Serial No. 330,219.

*To all whom it may concern:*

Be it known that I, HOWARD E. WILLIAMS, a citizen of the United States, residing at Compton, in the county of Los Angeles and State of California, have invented a new and useful Method of Planting Seed and an Agricultural Implement for Performing the Same, of which the following is a specification.

This invention relates to a method of planting seed and also to an implement for preparing the ground and seeding the same in one operation, and an object of the invention is to construct an implement of this character which will plow and form ridges in the field, level off the ridges, sow the seed in drills in the crest of the ridge and roll the earth over the seeds.

Another object is to provide a method of seed planting which will facilitate the supplying of moisture to the seed and growth of the seed.

Another object is to effect the foregoing by a comparatively simple construction.

Other objects and advantages will appear in the subjoined detailed description.

The accompanying drawings illustrate the invention.

Figure 1 is a side elevation of an agricultural implement made in accordance with the provisions of this invention, a portion of the hitch bar being broken away to contract the view.

Fig. 2 is a plan view of Fig. 1.

Fig. 3 is a side elevation corresponding to Fig. 1, excepting that the parts are in the positions they occupy when the implement is at work in the field, and the near front wheel is indicated in broken lines.

Fig. 4 is a plan view of the implement wheels, plows, leveler bar, leveling rollers, seeders and seed-covering rollers, to show the relation of the operating parts to one another, the ridges and channels produced by the implement also being indicated.

Fig. 5 is a side elevation of one of the plow carrying arms and the immediately adjacent parts, the cross bars being shown in section.

Fig. 6 is an enlarged outer side elevation of the forward end of the implement and wheel frames and one of the frame-tilting connections between the same.

Fig. 7 is an enlarged inner side elevation analogous to Fig. 6, the frame cross bars being in section on line indicated by $x^7$—$x^7$, Fig. 2.

Fig. 8 is a sectional elevation on line indicated by $x^8$—$x^8$, Fig. 6.

Fig. 9 is a fragmental plan view partly in section on line indicated by $x^9$—$x^9$, Fig. 6.

Fig. 10 is a front elevation of the implement and wheel frames, the front wheels and axle, the leveler bar and the leveler rollers, the ground also being indicated and one of the wheels being shown in a furrow.

Fig. 11 is a sectional elevation on line indicated by $x^{11}$—$x^{11}$, Fig. 1.

There is provided an implement frame 1 having at one end a vertical bearing 109 for a fork 3 mounted on a rear caster wheel 4. A seat 5 is mounted on a standard 6 projecting up from the frame 1. The implement frame 1 comprises longitudinally extending side bars 7, front upper and lower cross bars 8, 9 and rearwardly converging rear bars 10. The upper and lower cross bars 8, 9 are connected together at their ends by standards 11 which constitute parts of the implement frame.

A second frame, which will be designated as the wheel frame, is indicated in general by the character 12 and, in this instance, is constructed as follows: Adjacent the standards 11 and in endwise shiftable relation thereto are standards 13 connected to each other near their upper ends by a cross bar 14 and connected to each other near their lower ends by a lower cross bar 15. The frame 12 is mounted on and supported by the front wheels 2 and for this purpose an axle 16, on which the wheels 2 are mounted, is connected with the lower ends of the standards 13. The connection is such that if the axle be tilted toward either end the standards 13 may assume a perpendicular position relative to the surface of the ground over which the implement is traveling. In this instance the axle 16 is rotative in journal boxes 17 which are flanged at 18 at their inner ends and provided at their outer ends with lugs 19. The boxes 17 are accommodated in openings 20 in the lower ends of the standards 13, and notches 21 communicating with the openings 20 accommodate the lugs 19 while the boxes are being inserted in the openings 20. After the boxes have been inserted they are turned to move the lugs 19 out of register with the notches 21. The openings 20 are somewhat larger than the diameter of the boxes 17, thus providing a loose connection between the axle and standards 13 so that the tilting mentioned above can take place.

The front wheels 2 are capable of driving the axle 16 on forward movement only of the implement and for this purpose the wheels 2 are loosely mounted on the axle and the hubs of said wheels are provided with toothed clutch members 22 adapted to engage toothed clutch members 23 fixed by set screws 24 or their equivalents to the axle 16. The teeth of the clutch members are so arranged that the associated clutch members grip each other when the wheels 2 are turned forwardly, and the teeth of the clutch members 22 slide over the teeth of the clutch members 23 when the wheels 2 are turned backwardly.

Means are provided to vertically adjust the standards 11 relative to the standards 13 so that tilting of the implement frame laterally or sidewise relative to the axle 16 and wheel frame may be accomplished. The purpose of this tilting is to level up the implement frame when either of the wheels 2 is running in a furrow and the other on the surface of the ground. The construction at present employed for accomplishing this is as follows: The standards 13 are pivoted at 25 to bell crank levers 26 which are pivoted at 27 to the standards 11. The bell crank levers 26 are pivoted at 28 to connecting rods 29 which in turn are pivoted at 30 to the opposite ends of an oscillatory lever 31 that is pivoted at 32 to a cross bar 33 of the implement frame 1. The lever 31 is pivoted at 34 to a connecting rod 35 which in turn is pivoted at 36 to a hand-operated lever or crank arm 37 that is pivoted at 38 to the frame 1. The lever 37 may be held in various positions of adjustment and for this purpose there is provided the well known latching means indicated in general by the character 39. Thus when the lever 37 is operated it oscillates the lever 31 to move the rods 29 endwise and thus operate the bell-crank levers 26 so as to raise either of the standards 11 and lower the other standard 11. The standards 13 are pivoted at 40 to links 41 which are pivoted at 42 to the standards 11. The levers 26 and links 41 are at the outer faces of the standards 11, 13 so as to hold the implement and wheel frames against relative lateral movement.

Projecting rearwardly from the cross bar 9 at spaced intervals therealong are forked ears 43 to which are pivoted at 44 plow-supporting arms 45. To the plow-supporting arms 45 are fastened by clamps 46 a pair of cross bars 47 which are thus supported by the arms 45. Adjustably mounted on the bars 47 by clamps 48 are plows 49. To raise and lower the plows 49 links 50 are pivoted at 51 to the arms 45 and are also pivoted at 52 to crank arms 53 which are mounted on and operated by a shaft 54. The shaft 54 is provided with another crank arm 55 which is pivoted at 56 to a connecting rod 57 that is pivoted at 58 to a hand-operated lever or crank arm 59. The lever 59 is pivoted at 60 to the frame 1 and there are provided well known latching means 61 for holding the lever 59 in various positions of adjustment whereby the plows may be held above the surface of the ground and at various depths in the ground. The shaft 54 turns in bracket journals 62 fastened to the side bars 7 of the implement frame.

Pivoted to the arms 45 at 63 are roller supporting arms 64 and in each pair of the arms 64 is journaled a leveling and tamping member in the form of a roller 65, the rollers being interposed between planes extending longitudinally of the implement through the plows 49. The middle plow 49 is double, that is to say, it is provided with a plow share on each side so as to turn the earth outwardly into ridges on opposite sides of the path of travel of the middle plow. The side plows 49 are single with their shares arranged to turn the earth inwardly toward the center line of the machine and thus add the earth turned by these plows to the earth turned outwardly by the middle plow.

The means provided at present for raising and lowering the arms 64 to adjust the pressure of the rollers 65 on the ridges formed by the plows 29 are constructed as follows: To each of the arms 64 is pivoted a connecting rod 66 which in turn is pivoted at 67 to a crank arm 68. The crank arms 68 are all mounted on and turned by a shaft 69 which is adapted to rock in bearings 70 fastened to the frame side bars 7. The shaft 69 is also provided with a crank 71 in the form of a hand-operated lever, there being well known latching means 72 for holding the lever 71 in different positions to which it may be adjusted for holding the rollers 65 at different elevations relative to the surface of the ground on which the implement is operating. On the connecting rods 66 are positioned coil springs 73 between blocks 74, through which the rods 66 slide, and pins 75 adapted to be selectively placed in any one of a number of holes 76 in the rods 66 to regulate the tension of the spring. The rods 66 are provided with heads 77 at their upper ends to prevent them from becoming detached from the blocks 67. When the lever 71 is in any given position of adjustment, the pressure of the springs 73 is exerted to hold the rods 66 in their outermost positions relative to the blocks 67 so as to yieldingly hold the arms 64 against upward movement. The pressure of the springs 73, when the rollers 65 are pressed against the earth, is thus transmitted to the rollers so as to yieldingly hold the rollers against the earth. The pressure exerted by the springs 73, when the rollers 65 engage the earth, may be increased or diminished by moving the lever 71 forwardly or rearwardly.

Mounted on the two outermost of the arms 45 are brackets 78 to which are pivoted at 79 leveler carrier arms 80. To the lower ends of the arms 80 are fastened a leveler member 81 which may be in the form of a bar extending transversely of the implement. Near its middle the leveler bar 81 is connected by a chain 82, or its equivalent, to one of the arms 45, the chain 82 allowing the leveler bar 81 to swing rearwardly and limiting the forward movement of the leveler bar beyond a predetermined position. Thus when the arms 45 are lowered to lower the plows 49 the lever bar 81 will also be lowered, and when the leveler bar is in the lowered position it is adapted to scrape the crests of the ridges formed by the plows so as to flatten or level the tops of said ridges and join the ridges formed by the middle plow to the adjacent ridges formed by the side plows and thus broaden the same in preparation for the sowing of the seed in drills as will be made clear hereinafter.

Included in the implement frame 1 is a downwardly extending support 83 to which is pivoted at 84 seeding drills 85 that receive the seed from seed boxes 86, the mechanism for feeding the seed from the seed boxes into the spouts 87 of the drills being indicated in general by the character 88 and said mechanism being driven by the sprocket chain 89 engaging a sprocket wheel 90 mounted on the axle 16. Thus the operation of the axle by turning of the wheels 2 causes feeding of the seeds to the drills 85. It is not necessary to describe the drills and seed-feeding mechanism herein in detail since such construction is well understood in the art pertaining to seed drills.

The pivots 84 also serve to pivotally connect arms 91 to the support 83, the arms 91 being arranged in pairs and each pair rotatively supporting a pair of rollers 92, the axes of said rollers being indicated at 93. Each pair of arms 91 is provided with a pin 94 extending through a slot 95 in the associated drill 85 so that the arms 91 can move vertically to some extent relative to the drills 85. Thus when the drills and rollers 92 are at work in lowered position the rollers 92, if they encounter a lump of dirt or a stone, will move upwardly to some extent without raising the drills. Pivoted at 96 to each of the drills 85 is a connecting rod 97 adapted to slide through a block 98 pivoted at 99 to a crank arm 100. The crank arms 100 are all mounted on and are turned by a shaft 101 journaled in bearings 102 mounted at opposite sides of the frame 83. Surrounding the connecting rods 97 are coil springs 103, said springs being interposed between the blocks 98 and abutments 104 on the rods 97. Thus the tendency of the springs 103 is to yieldingly hold the drills 85 in the ground when the shaft 101 is turned sufficiently to lower the drills into the ground. If the drills strike any obstruction the springs 103 yield sufficiently to allow the drills to pass over the obstruction without injury to the drills. The rods 97 are provided with heads 107 on their upper ends so that said rods will not become disconnected from the blocks 98. The shaft 101 is provided with an operating lever or crank 105 and latching means 106 are provided for the lever 105 to hold said lever in different positions of adjustment, said latching means being of well known construction.

In practical operation, assuming that the parts are in the positions shown in Fig. 1 of the drawings, that is in the inoperative positions, when the driver desires to seed a given area of ground, he will first operate the lever 59 to lower the plows 49 the desired depth into the ground and to lower the leveling bar 81 and the rollers 65. When the plows 49 are lowered, as just described, such operation also lowers the leveling bar 81 and thus movement of a single control member produces three results. It is to be distinctly understood that the leveling bar 81 and rollers 65 each constitute leveling means and that, though I have shown both the bar and the rollers embodied in the implement illustrated, I may dispense with one or the other, or may employ both of them. In some instances it may be sufficient to employ the leveling bar alone and in other instances it may be advisable to employ only the rollers, and in still other instances both the bar and rollers may be necessary to obtain the desired results, namely, the smoothing and slight packing or tamping of the soil. It is to be noted that the rollers 65 will produce a greater tamping or packing effect than the leveling bar, since the pressure of the springs 73 may be utilized by properly adjusting the lever 71. In some soils or under some conditions and for preparing the ground for certain varieties of seeds, it is advisable to tamp or pack the earth over the seeds harder than for other seeds.

The implement will now be drawn over the field by any suitable power attached to the hitch bar indicated at 108 and the plows will produce furrows or channels a and ridges b, Figs. 4 and 10. The middle plow throws the soil outwardly in ridges on both sides of the path of the middle plow and the outer plows throw the soil inwardly in ridges adjacent the ridges of soil formed by the middle plow. Thus initially the plows of the machine illustrated form four complete ridges of soil and said ridges lie directly in the paths of the rollers 65. As the implement progresses the crests of the ridges are scraped and leveled by the bar 81, if said bar be present in the machine, and thereafter the rollers 65 roll and tamp and still further level the crests of the ridges, the result being that the adjacent lying ridges formed initially by the plows are joined so as to form ridges $b$ of a substantial width and substantially level. The pressure of the rollers 65 on the ridges may be increased or diminished by moving the lever 71 forwardly or rearwardly.

When the implement has been advanced sufficiently to bring the beginning of the ridges beneath the drills 85, the lever 105 will be operated to lower the drills into the ridges and when this is done there will be a pair of drills operating in each ridge, since the drills are positioned rearwardly in alinement with the rollers 65 and in planes extending longitudinally of the implement between the plows. The drills plant the seed in a manner well understood in the art pertaining to drills and the rollers 92 operate to cover the seeds thus sown with soil and to press the soil firmly upon the seeds.

The implement continues across the field in this manner producing, in this particular instance, three channels and two ridges and when the far side of the field is reached the implement is turned around and started on its return trip with one of the wheels 2 in one of the channels $a$ formed by one of the side plows 49 as clearly shown in Fig. 10.

This of course tends to tilt the machine sidewise so as to tilt the implement frame and thereby make a difference in the depth of penetration of the different plows and drills and unequal pressures on different portions of the bar 81 and rollers 65. To overcome this tendency the operator will move the lever 37 in the appropriate direction to level up the implement frame. For example, if the left-hand wheel looking at the front of the implement, as in Fig. 10, is running in the channel $a$, the operator will pull the lever 37 rearwardly so as to move the left-hand standard 11 upwardly and the right-hand standard 11 downwardly relatively to the standards 13. When this is done the implement frame 1 will be level as clearly shown in Fig. 10 even though the wheel frame is tilted sidewise. The implement then proceeds with the plowing, leveling and seeding operations as before. When the implement reaches the starting side of the field it is again turned and the other wheel 2 is placed in the near furrow or channel just completed and the operator shifts the lever 37 forwardly so as to again level the implement frame to meet the new condition caused by tilting of the wheel frame toward the plowed portion of the field. The operator may thus continue back and forth across the field until the desired area is planted. Of course if deemed desirable the operator may cause the implement to be driven over the field continuously in one direction instead of back and forth and the channeling and ridging effects will be same.

Planting the seeds in the ridges is of advantage for many crops for the reason that when the field is irrigated the water runs in the channels $a$ and permeates the sides of the ridges to the seed or the plants developed from the seed. Furthermore, the soil over the seeds does not become incrusted by alternate wetting and drying as results in flat planting or planting in trenches or channels. Another advantage of planting in ridges is that the irrigation water cannot wet the portions of the plants above the soil and thereby produce rust and other diseases deleterious to plant life and caused, or at least aided, by wetting of the stalk and leaves of the plant.

It is understood that the invention is not limited in its broader phases to the exact details of construction shown in the drawings and described above, but that the invention also includes such changes and modifications as lie within the spirit and scope of the appended claims.

As an example of a modified construction it is clear that two single plows may be used in lieu of the double plow to perform the same function and that the implement may be constructed and the various parts arranged to form but one ridge or to form any number of ridges and also to plant the seed in a single drill in each ridge or in a plurality of drills in each ridge. Thus to form a single ridge the double plow may be omitted and the side plows placed closer together. In planting cotton seed it is preferable to plant the seed in single drills in the ridges, and the seed of sugar beets may be planted in double drills in the ridges.

Though I have shown and described the seed-feeding mechanism 88 as being operatively connected with the axle 16, it is to be understood that said mechanism may be otherwise driven. For example the mechanism 88 may be just as readily connected with either or both of the rollers 65 so as to be driven by said roller or rollers, but such construction is well known in the art pertaining to seeders and therefore need not be described in detail herein.

I claim:

1. In an agricultural implement, the combination of a frame, means carried by the frame to form a pair of ridges and channels on opposite sides of the pair of ridges, means carried by the frame rearwardly of the first-named means to join the pair of ridges into a single ridge between the channels, drills carried by the frame rearwardly of the second-named means, and means movably supporting the frame.

2. An agricultural implement comprising a frame, ridge-forming plows carried by the frame and positioned in different longitudinal planes of the implement, the plow nearer the central plane being constructed to throw the soil in ridges on both sides of the path of the plow and the plows nearer the sides of the frame being constructed to throw the soil inwardly in ridges lying adjacent the first named ridges respectively, means carried by the frame rearwardly of the plows to level the soil of adjacent ridges to join the adjacent ridges into one ridge, seed drills carried on the frame in position to cause them to enter the ridges, means to feed seeds to the drills, and wheels connected with the frame to support said frame.

3. An agricultural implement comprising a wheel frame, wheels connected with the wheel frame, an implement frame vertically shiftable relative to the wheel frame, means to shift the opposite sides of the implement frame in opposite vertical directions relative to the wheel frame, ridge-forming means carried by the implement frame, and means carried by the implement frame to sow seeds in the crests of the ridges.

4. An agricultural implement comprising a wheel frame, wheels connected with the wheel frame, an implement frame mounted on and tiltable sidewise relative to the wheel frame, means to tilt the implement frame to one side or the other relative to the wheel frame, ridge-forming means carried by the implement frame, and means carried by the implement frame to sow seeds in the crests of the ridges.

5. An agricultural implement comprising a wheel frame, wheels connected with the wheel frame, an implement frame mounted on and tiltable sidewise relative to the wheel frame, means to tilt the implement frame to one side or the other relative to the wheel frame, ridge-forming means carried by the implement frame, means carried by the implement frame to level the tops of the ridges, and means carried by the implement frame to sow seeds in the leveled ridges.

6. An agricultural implement comprising a frame, wheels connected with and supporting the frame, ridge-forming means and rollers shiftably mounted on the frame, means including a single control member for raising and lowering the ridge-forming means and rollers, a second control member, means operative by the second control member to produce more or less pressure of the rollers on the ridges, and means carried by the frame to sow seeds in the ridges behind the rollers.

7. An agricultural implement comprising a frame, ridge-forming means and rollers carried by the frame, pressure producing means connected with the rollers, means to increase or diminish the pressure when the rollers are in contact with the ground, and means carried by the frame to sow seeds in the ridges behind the rollers.

8. An agricultural implement comprising a frame, ridge-forming plows carried by the frame and positioned to throw the soil inwardly toward one another to form adjacently lying ridges, means carried by the frame rearwardly of the plows to level and join the soil of the adjacent ridges into one ridge, a seed drill carried by the frame in position to cause it to enter the leveled ridge, and means to feed seeds to the drills.

9. The method of planting seed which consists in forming channels and throwing the soil therefrom into adjacently lying ridges between the channels, leveling the crests of the ridges to unite said ridges into a single ridge, and planting seed in the crest of the leveled ridge.

10. The method of planting seed which consists in simultaneously forming spaced channels and a ridge between the channels, leveling the ridge, and then planting seed in the crest of the leveled ridge.

Signed at Los Angeles, California, this 7th day of October, 1919.

HOWARD E. WILLIAMS.

Witnesses:
GEORGE H. HILES,
L. BELLE WEAVER.